April 14, 1964   W. G. AXTELL   3,128,856
LUGGAGE CASE

Filed April 3, 1962   3 Sheets-Sheet 1

INVENTOR.
WILLARD G. AXTELL
BY
ATTORNEYS

April 14, 1964     W. G. AXTELL     3,128,856
LUGGAGE CASE
Filed April 3, 1962     3 Sheets-Sheet 2
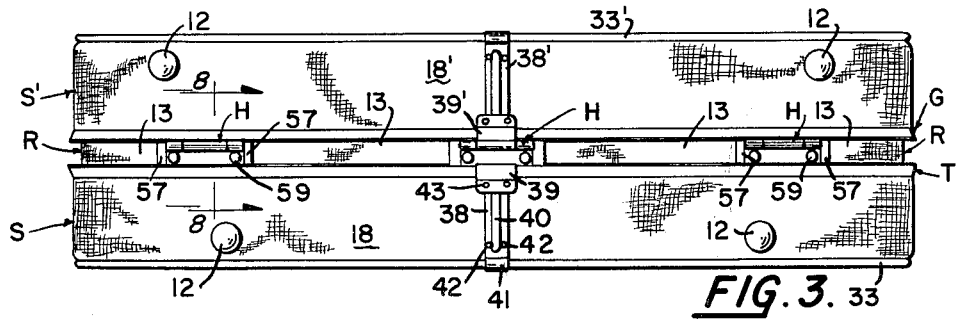
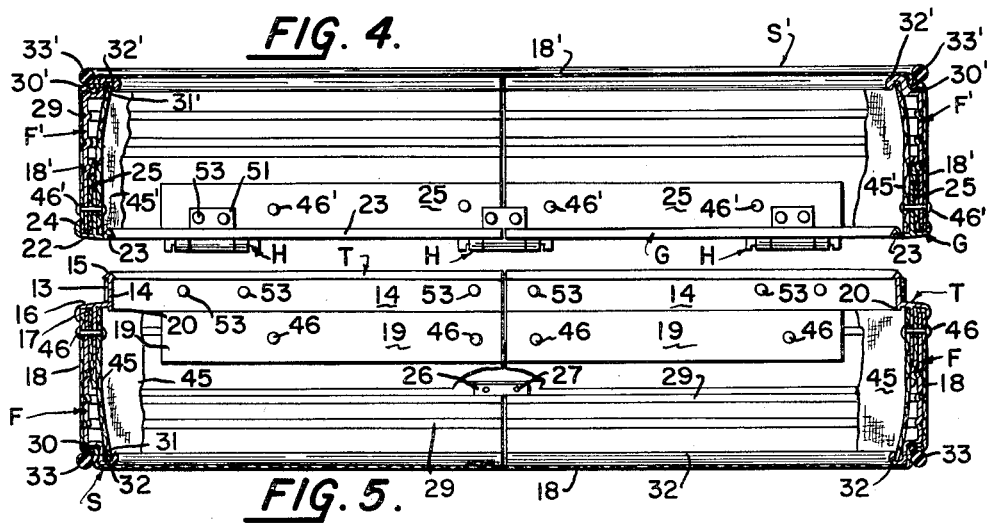
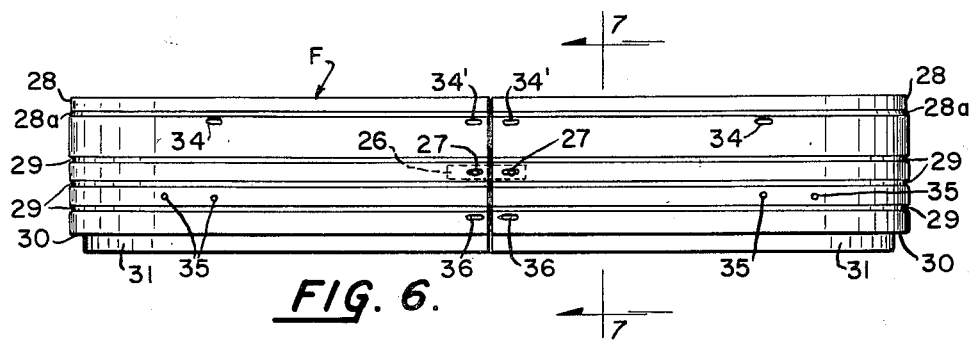
INVENTOR.
WILLARD G. AXTELL
BY
*Horace B. Van Valkenburgh*
*Gary D. Fields*
ATTORNEYS April 14, 1964

W. G. AXTELL 3,128,856

LUGGAGE CASE

Filed April 3, 1962

INVENTOR.
WILLARD G. AXTELL
BY
ATTORNEYS

United States Patent Office 3,128,856
Patented Apr. 14, 1964

3,128,856
LUGGAGE CASE
Willard G. Axtell, Englewood, Colo., assignor to Shwayder Brothers, Inc., Denver, Colo., a corporation of Colorado
Filed Apr. 3, 1962, Ser. No. 184,848
7 Claims. (Cl. 190—49)

This invention relates to luggage cases, and more particularly to so-called "soft-sided" luggage cases.

With the advent of air line travel, the weight of luggage has become quite important, since the transportation of an air passenger's luggage, in excess of a nominal weight, is very costly. Thus, a heavy luggage case adds to the probability of the passenger paying dearly for excess weight. A luggage case formed of wood layers adhered together and covered with a layer of plastic or the like, is unduly heavy for air travel. Also, a luggage case having a central frame and concave shells, as of metal covered with plastic or molded from resin and a filler, can be extremely durable if properly made, but is usually heavier than a so-called "soft-sided" luggage case, which comprises merely fabric stretched over a framework, such as formed of metal tubing. Such a soft-sided luggage case can be light in weight but previous frames are often broken or forced out of shape by other pieces of luggage being piled on top, through dropping when full or through similar rough usage. Thus, it is highly desirable to provide a luggage case having a fabric cover but which will withstand rough usage.

Among the objects of this invention are to provide a novel soft-sided luggage case; to provide such a luggage case which includes a cover of fabric or the like distended over a metal frame; to provide such a luggage case in which the cover is attached to the frame in a novel manner; to provide such a luggage case which facilitates the installation of a lining on the inside thereof; to provide such a luggage case which reduces the amount of lining necessary; to provide such a luggage case which is light in weight but durable in use; and to provide such a luggage case which is economical to manufacture.

Additional objects and the novel features of this invention will become apparent from the description which follows, taken in conjunction with the accompanying drawings, in which:

FIG. 3 is a further enlarged, bottom plan view of the luggage case, in closed position;

FIG. 4 is a longitudinal section, taken along line 4—4 of FIG. 2, showing details of a frame and hinge construction of one section of the luggage case;

FIG. 5 is a longitudinal section, taken along line 5—5 of FIG. 2, showing details of the frame and hinge construction of the other section of the luggage case;

FIG. 6 is a rear elevation of a frame which extends around one section of the luggage case;

Figure 1:
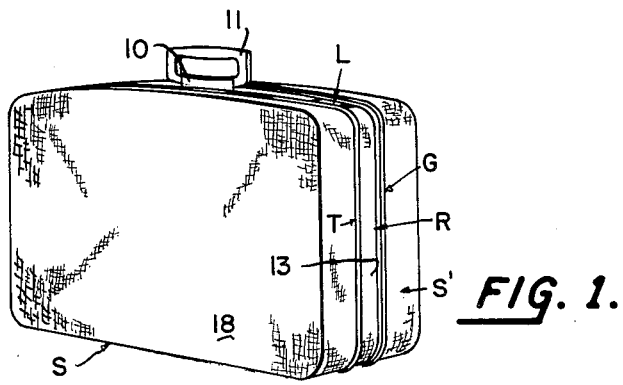
FIG. 1 is a perspective view of a soft-sided luggage case constructed in accordance with this invention.
Figure 2:
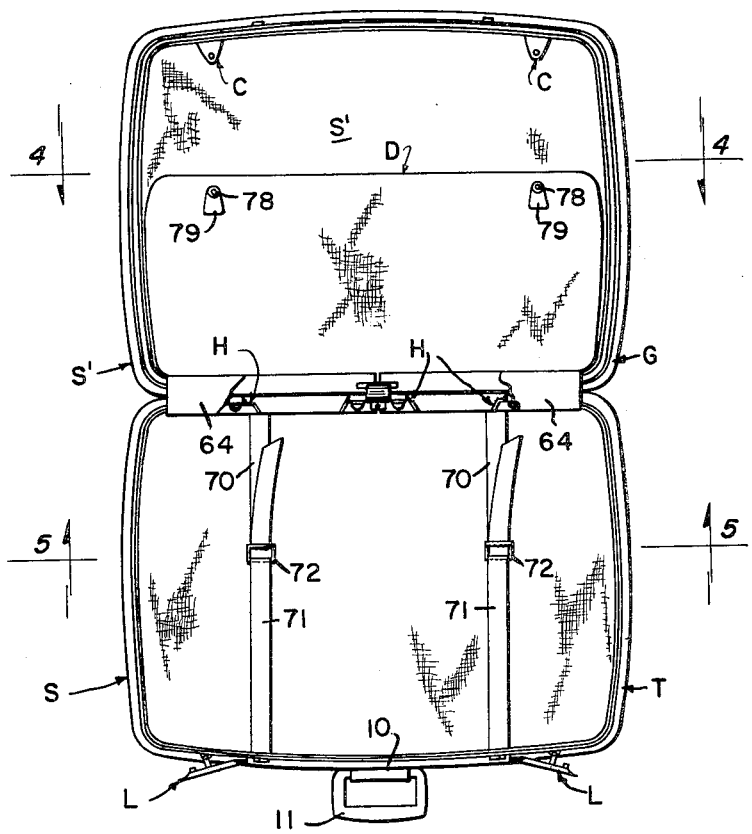
FIG. 2 is an enlarged plan view of the luggage case of FIG. 1 in open position, with a divider in partially raised position.

In accordance with this invention, a soft-sided luggage case includes two opposed, concave, fabric covered sections S and S', which are respectively provided with tongue and groove strips T and G adapted to interfit when the case is closed, as in FIG. 1, to form a seal between the sections. The strips T and G are respectively mounted on frames F and F' of FIGS. 4 and 5, each of which, along with the strips T and G, preferably extends around the entire periphery of the respective luggage case section, thereby adding sufficient rigidity to the case structure to withstand stresses imposed when the case is dropped, as when fully loaded, and also when loads are placed on the case in upright position, a in FIG. 1, or on either side. Each strip T and G and also each frame F and F' may be extruded from a light metal, such as an aluminum or magnesium alloy. Although any other desired exterior appearance may be provided, the tongue and groove strips, as shown, form a recess R which extends longitudinally around the case, as in FIG. 1. As seen in FIG. 2, a lock structure L is conveniently disposed in protected position within recess R, such lock structure advantageously being of the type described and claimed in copending application Ser. No. 789,675 of Lee F. Garmon, Jr., and Willard G. Axtell, filed February 2, 1959, now Patent No. 3,032,248. Conveniently, a support 10 for a handle 11 may be mounted on the lock structure L. As will be evident, other types of locks, drawbolts or the like may be used for detachably connecting the two sections of the luggage case together along its top. The bottoms of the two sections are hinged together by three hinges H, conveniently installed in recess R, as in FIG. 3, in a manner described later. When the case is in the upright position of FIG. 1, it may rest on feet 12 of FIG. 3, which are mounted on the respective frames F and F'. Fabric strips 13 are conveniently secured, as by adhesive, to the base of recess R, between hinges H at the bottom and between the end hinges H and the lock structure L, around each end of the case.

As shown in FIG. 5, the tongue strip T of the lower case section S may include a tongue 14 which is conveniently provided with a pointed edge 15 and extends upwardly from a lateral flange 16, the latter being slightly inclined from the perpendicular to form one side wall of recess R, of which tongue 14 forms the base. Edge 15 conveniently extends laterally outwardly beyond tongue 14 to protect the edge of fabric strip 13, while flange 16 terminates at its outer end in a downwardly turned hook 17 adapted to clamp a flexible covering 18, conveniently a heavy fabric, against the outside of frame F, as described below. Fabric cover 18 extends over the upper edge and downwardly along each end and side of frame F, as well as across the bottom thereof. A series of flanges 19 may extend downwardly from flange 15, intermediate its ends, for engaging or clamping fabric cover 18 on the inside of frame F. Each flange 19 preferably terminates short of each of the curved corners of section S, thus preferably extending only along the generally flat ends and sides, as shown in FIG. 5. Also, a rib 20 may extend downwardly from the inner end of flange 16, opposite tongue 14, for a purpose to be described.

Groove strip G of the upper case section S, as in FIG. 4, may include a lateral flange 22, conveniently inclined slightly from the perpendicular to form the opposite side of recess R and having a grooved or inverted V-shaped inner edge 23 to engage pointed edge 15 of tongue strip T. The outer edge of flange 22 may be provided with an upwardly turned hook 24 for clamping a fabric cover 18' against the outside of the lower edge of frame F'. Fabric cover 18' extends around the lower edge and upwardly along each end and side of frame F', as well as across the top thereof. A series of flanges 25 extend upwardly, intermediate the ends of flange 22, for clamping or engaging fabric cover 18' along the inside of frame F' and terminate short of the curved corners of section S', as in the case of flange 19 of tongue strip T. The upward extent of inner edge 23 of flange 22 functions similarly to the rib 20 of tongue strip T, as will be described later.

Figure 7:
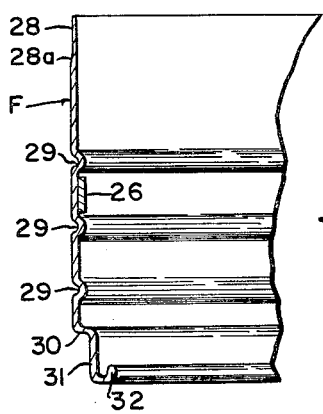
FIG. 7 is a fragmentary vertical section, taken along line 7—7 of FIG. 6.

Frame F, as in FIGS. 6 and 7, is conveniently made of extruded aluminum or magnesium alloy, as indicated previously, which is cut to length and bent to the same shape as the section S, the abutting ends being initially attached together by a fish plate 26, which may be relatively short and narrow and placed on the inside, as in the dotted position indicated in FIG. 6. Fish plate 26 is conveniently attached to the frame by rivets 27, for assembly purposes, since the joint at the abutting ends of the frame is reinforced in a manner described later. Frame F is conveniently provided with a thinner upper edge 28, the extent of which corresponds to the hook 17 of tongue strip T and at the lower end of which is a bevel 28a. The frame F is also provided with a plurality of circumferential grooves 29 for strengthening the frame. The outer edge of the frame F has an inwardly extending flange 30 and a depending or downwardly extending flange 31 which terminates in an inwardly and then upwardly extending hook shaped portion 32, which add additional strength to the frame, particularly at the edges of the case which are most likely to be struck. Before the length of extrusion is bent to shape, a series of cuts, as by a saw, are conveniently made through hook shaped portion 32 and flanges 30 and 31, at the positions of the corners, to facilitate bending at the corners.

Flanges 30 and 31 also provide a recess around the lower edge of the frame in which is received a welt 33, which is conveniently formed of plastic or the like and thereby better able to withstand impact or glancing blows than fabric cover 18. In other words, the welt 33 serves as a bumper to prevent damage to the case. Welt 33 is conveniently provided with an extending rib which is conveniently sewn to fabric cover 18 at the position which it will finally assume, the rib being on the inside of the welt 33 when the fabric cover is installed and thus within the recess formed by flanges 30 and 31 and shielded by the welt from view in the finished case. Thus, when fabric 18 is stretched tautly across the bottom of frame F, welt 33 will be received in the recess formed by flanges 30 and 31. The fabric 18 may then be pulled tautly across the sides and ends of frame F and then over the upper edge thereof. Then, the tongue strip T is placed on the frame, so that the inside flanges 19 will push the inner edges of fabric 18 downwardly along the inside of the frame until the underside of flange 16 engages the fabric stretched over the upper edge of the frame and hook 17 will clamp or hold the fabric against the outside of upper edge 28 of the frame. As hook 17 is moved downwardly on the outside, it will push fabric 18 inwardly toward bevel 28a, thereby tending to avoid a gap at the lower edge of hook 17. The thinner upper edge 28 of the frame facilitates placement of tongue strip T on the fabric and also tends to avoid bunching of the fabric at the upper edge of the frame. Thus, not only is the fabric covering 18 pulled taut over the frame but a neat appearance is also produced. Then, the tongue strip T may be attached to the frame, as by rivets extending through slots 34 and 34' of FIG. 6 and similar slots placed at appropriate positions along the ends and front of the frame. Prior to placement of the tongue strip T, a suitable length may be cut from an extrusion, the tongue strip bent to the shape shown in FIG. 2 and the abutting edges secured, for installation, by a small fish plate, such as similar to fish plate 27 for the frame and similarly placed on the inside of the tongue strip, as by riveting to the abutting ends of flange 19. Frame F may also be provided with holes 35, for rivets which extend through the fabric and attach feet 12 to the frame, it being noted that holes 35 are located so that the inner holes 35 may be used for attachment of feet 12 to case section S, while the outer holes 35 may be used for attachment of feet 12 to case section S', when frame F of FIG. 6 is used as frame F' for case section S'. Slots 36, as well as slots 34', are used for attachment of clip 38 and clamp 39 of FIG. 3, as by rivets and described later.

To facilitate placing the fabric so that it will be taut and to prevent puckering, it is desirable to cut a V-shaped piece from the edge of the fabric, at the center of the rear of section S, so that when the fabric is pulled tightly around the frame, the cut edges will just meet and can be held in place and covered by clip 38 of FIG. 3, which is provided with a center rib 40 and a curved outer end 41 engaging welt 33. The inner end of clip 38 is further held in position by arcuate clamp 39, which extends onto the edge of tongue strip T. Both clip 38 and clamp 39 may be conveniently attached in position by rivets 42 and 43, as shown. Rivets 42 and 43 and clip 38 and clamp 39 also further secure the abutting ends of frame F and tongue strip T together.

Frame F' of section S' is conveniently similar to frame F; in fact, the same frame may be used for either section, as indicated previously, although different holes may be used for attaching feet 12. Conveniently, the sections S and S' are assembled completely, prior to attachment of hinges H to tongue strip T and installation of divider D of FIG. 2. Thus, hinges H are attached to section S' when it is assembled and later attached to section S, just prior to installation of divider D.

The assembly of section S' is similar to that described above for section S, except that the hinges H are attached to groove strip G, as described later, prior to installing the strip on the section, with the center hinge H acting as a fish plate to secure the abutting ends of groove strip G. Thus, the fabric cover 18' for section S', with welt 33' attached thereto, is pulled taut across the top of frame F', so that the welt will be received in the recess formed by flanges 30' and 31' of the frame. Then the cover 18' is pulled taut across the sides and ends of frame F' and pulled over the lower edges and into the inside, the latter operation being conveniently performed with the frame upside down, i.e., in a position reverse to that shown in FIG. 4. The groove strip G is then placed onto the edge of the frame, so that flanges 25 will push fabric 18' taut over the edge of the frame and engage or clamp the fabric on the inside, while flange 22 and hook 24 will respectively hold or clamp the fabric against the edge and outside of the frame. As before, the thinner lower edge and bevel of frame F', corresponding to upper edge 28 and bevel 28a of frame F, respectively, facilitate placement of groove strip G on the fabric stretched over the frame F' and produce a neat appearance. The tongue strip G is then secured to the frame, as by rivets, and the clip 38' and clamp 39' of FIG. 3, which are respectively similar to clip 38 and clamp 39, as well as the feet 12.

Before the case sections are attached together, each is conveniently provided with a lining for the inside of the respective frame F and F'. The inside of fabric 18 and 18' will normally be sufficient for the remainder of the inside of the case sections. A liner 45, conveniently formed of fabric covering a backing strip, as of cardboard, and conveniently stitched thereto along the edges with the edges of the fabric overlapping the edges of the cardboard, is adapted to be snapped into position with one edge received in the hook shaped portion 32 of frame F and the other edge abutting the underside of flange 16 and prevented from moving out of position by rib 20. Thus, each edge of the liner is protected against being accidentally dislodged. For additional security, a series of rivets 46 may extend inwardly from flanges 19 and riveted over onto liner 45. Some of rivets 46 may also extend through the frame F and cover 18, being riveted onto the cover on the outside, while others may merely be mounted on flanges 19. A similar liner 45' is similarly installed in case section S', one edge thereof abutting flange 22 and deterred from displacement by the notch structure of inner edge 23 and the other edge being received in the hook shaped portion 32' of frame F'. Rivets 46' may also extend inwardly from flanges 25 for additional attachment of the lining, similarly to rivets 46.

Figure 8:
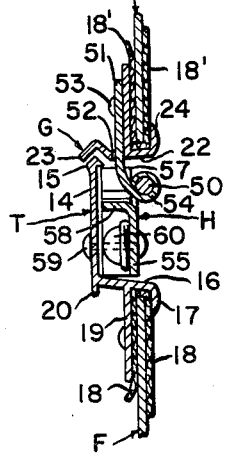
FIG. 8 is an enlarged, fragmentary vertical section, taken along line 8—8 of FIG. 3, showing details of a hinge.
Figure 9:
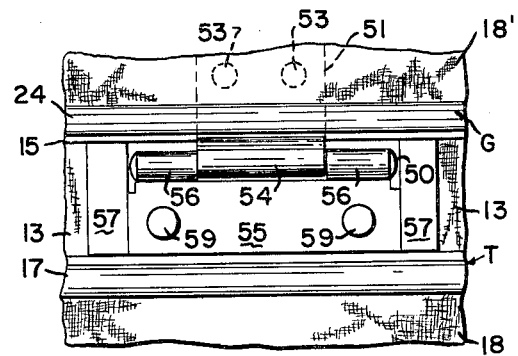
FIG. 9 is an enlarged, fragmentary rear view showing the hinge construction of FIG. 8.

As indicated previously, a plurality of hinges H, such as three, may be disposed in the recess R for attaching sections S and S' together at the bottom, as shown in FIGS. 2 and 3, although for a smaller luggage case, it may be found that only two hinges are necessary. Each hinge H, as in FIG. 8, conveniently includes a pivot pin 50 which is conveniently disposed adjacent groove strip G, so that the case sections will pivot about an axis readily permitting engagement and disengagement of the tongue strip T with the groove strip G, the edge 15 of the former and grooved edge 23 of the latter being shown slightly apart in FIG. 8 for clarity of illustration. One half of each hinge H may include a plate 51 which extends through a slot 52 in flange 22 of groove strip G and is attached thereto by rivets 53, shown also in FIGS. 5 and 9. The opposite edge of plate 51 is provided with an ear 54, which surrounds the central portion of pin 42, as in FIG. 9. The other half of each hinge H may include a plate 55 having a pair of spaced ears 56 surrounding the end portions of pin 50, as in FIG. 9. To space plate 55 outwardly from tongue 14, each end of the plate conveniently has a laterally extending, inwardly inclined flange 57 which engages tongue 14 and also covers the end of the corresponding fabric strip 13, as well as a central, inwardly extending flange 58 which also engages tongue 14. Hinge plate 55 may be attached to tongue 14 of tongue strip T by elongated rivets 59, with a generally conical bell 60 being placed around each rivet 59 to act as a spacer and maintain hinge plate 55 in the desired position. As will be evident from FIG. 8, each hinge H is generally within the recess R and thus is not only in a protected position but also is at least partially hidden from view, thus adding to the appearance of the luggage case.

After the case sections have been attached together by the hinges H, a divider D of FIG. 2 may be installed in the luggage case, divider D being mounted for pivotal movement from a closed position, in which the divider covers section S' to hold clothes and other articles packed therein in place, to an open position permitting access thereto. The divider D conveniently comprises a metal rod 62, shown in FIG. 11, bent to a generally rectangular shape and fastened at its ends, as by welding, then completely enclosed by fabric 63 which is stretched over the frame formed by rod 62, the fabric 63 conveniently being sewn together around three sides and a portion of the fourth, then turned inside out to place the seam on the inside. Rod 62 is then slipped therein and turned to its final position, while a short portion of the fabric is left to extend on the fourth side so that it may be sewn together after the rod is placed in position and may also be sewn to a conventional apron 64, shown in FIG. 2 and attached to the inside of case sections S and S'. Apron 64 extends over the exposed hinges and is fastened to flange 25 of groove strip G, as by appropriate rivets 46 of FIG. 5 which also attach liner 45 thereto, and to the inside of section S' by appropriate rivets 46' of FIG. 5 which also attach liner 45' thereto. Conveniently, clothes or other articles may be held in section S by two conventional pairs of straps 70 and 71 of FIG. 2, whose ends are fastened to opposite sides of frame F, behind liner 45, and are adjustably fastened at their inner ends by a buckle 72.

Figure 11:
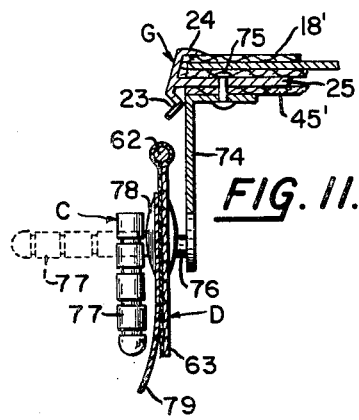
FIG. 11 is a vertical section, taken along line 11—11 of FIG. 10, showing details of the latch construction.
Figure 10:
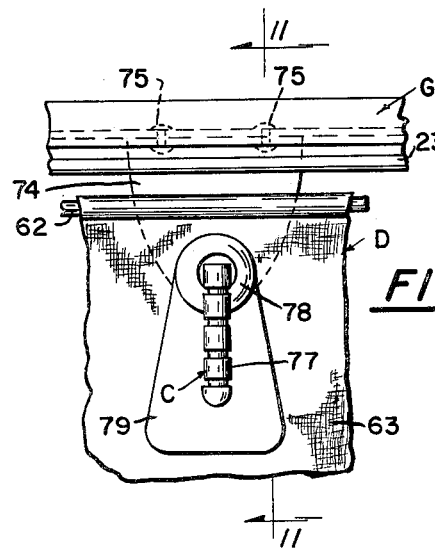
FIG. 10 is a fragmentary plan view showing a portion of the divider of FIG. 2 and a latch for holding the divider in closed position.

Advantageously, the divider D may be held in closed position, as in FIGS. 10 and 11, by catches C. Each catch includes an angle bracket 74 which is attached to flange 25 of groove strip G, as by a pair of rivets 75. A stem 76 extends outwardly from the extending leg of bracket 74 and a latch pin 77 is pivoted to the end thereof. The latch pins may be pivoted to the dotted line position of FIG. 11, so that the divider may be moved to or from closed position. When divider D is in closed position, latch pins 77 may be pivoted to the solid line position of FIG. 11, to hold the divider in place. Divider D is also provided with eyelets 78, mounted in positions corresponding to catches C, as in FIG. 2. A tab 79, conveniently made of plastic, is clamped between the front half of each eyelet 78 and fabric 63 of divider D, to facilitate pulling the divider off pins 77. Thus, to close the divider it is merely necessary to swing it across section S', when the latch pins 77 are extended in the dotted line position of FIG. 10, until the latch pins are engaged by eyelets 78, whereupon pins 77 may be pivoted to hold the divider in place, preventing clothes and other articles placed in section S' from falling out or becoming disarranged.

The strips T and G and frames F and F', while conveniently formed as unitary strips, may be composite, i.e., formed of two or more pieces attached together longitudinally or laterally, with some of the pieces forming the composite strip being non-metallic, if desired, to provide the desired configuration. Thus, the strips T and G and frames F and F' are formed substantially of metallic material.

From the foregoing, it will be readily apparent that a luggage case constructed in accordance with this invention fulfills to a marked degree the requirements and objects hereinbefore set forth. A soft-sided luggage case has been provided which includes two opposed sections, each having metal frames, conveniently made of a lightweight metal, such as aluminum or magnesium, and are readily formed by extrusion. Furthermore, the fabric covering is distended in taut condition over each metal frame and is held in place by the tongue and groove strips which hold or clamp the covering to the corresponding frame. Each frame also includes grooves which add to the strength thereof and flanges which not only provide additional strength but also form a recess which receives a welt which protects the exposed edges of the case sections. The frames and the corresponding tongue and groove strips are further provided with means which cooperate to hold a liner in place within the luggage case so that it cannot easily come out. In addition, the luggage case is light in weight and is economical to manufacture but is of a durable construction and is not easily damaged.

Although a preferred embodiment of this invention has been illustrated and described, it will be understood that various changes and variations may be made without departing from the spirit and scope of this invention.

What is claimed is:

1. A concave luggage case section comprising a strip formed substantially of metallic material which extends around the inner edge of said section, said strip being constructed and arranged to interfit with a corresponding strip of an opposite section when the case is closed, said strip being provided with a lateral flange having a rim at the inner edge thereof to form a recess for receiving one edge of a liner; a frame of substantial lateral extent formed substantially of metallic material, said frame extending around said section and being provided with a hook shaped flange at the outer edge thereof to form a recess for receiving the opposite edge of said liner; and a flexible covering extending over the outer edge of said frame and covering the outside of said frame, said strip being constructed and arranged to interfit with the inner edge of said frame to hold said cover in taut condition.

2. A luggage case section comprising a strip formed substantially of metallic material which extends around the inner edge of said section, said strip being constructed and arranged to interfit with a corresponding strip of an opposite section when the case is closed; a frame of substantial lateral extent formed substantially of metallic material, said frame extending around said section and being constructed and arranged to provide a recess; and a flexible fabric covering extending over the outer edge of said frame and provided with a welt formed of plastic and the like extending around the outer edges of said section, said welt being received in said recess and said flexible covering covering the outside of said frame, said strip being constructed and arranged to interfit with the inner edge of said frame to hold said cover in taut condition.

3. A concave luggage case section, as set forth in claim 2 wherein said frame is provided adjacent its outer edge with an inwardly extending flange and a flange depending therefrom to provide said recess.

4. A luggage case comprising two opposed concave sections which meet at the edges thereof when said case is closed, each said section comprising a strip formed substantially of metallic material, which extends around the confronting edge of said section and having a rib at the inner edge thereof, said strip being constructed and arranged to interfit with an opposed strip of the other section when the case is closed; a frame of substantial lateral extent and formed substantially of metallic material, extending around said section and having a hook shaped member formed on the other edge thereof; a flexible covering extending over the outer edge of said frame, covering the outside of said frame and folded over the inner edge of said frame, said strip being constructed and arranged to interfit with the inner edge of said frame to hold said cover in taut condition; a liner extending around the inside of said frame, one edge of said liner being received in said rib and the other edge of said liner being received in said hook shaped member for holding said liner inside said frame; hinge means pivotally connecting said sections together along one edge thereof; and releasable means for connecting said sections together at the opposite edge thereof.

5. A luggage case as defined in claim 4, wherein said frame is provided adjacent its outer edge with an inwardly extending flange and a flange depending therefrom to provide a recess; and a welt attached to said cover, said welt extending around the outer peripheral edge of said frame and disposed in said recess.

6. A luggage case comprising two opposed concave sections having rounded corners and which meet at the edges thereof when said case is closed, each said section comprising a strip formed substantially of metallic material which extends around the confronting edge of said section, said strip being constructed and arranged to interfit with an opposed strip of the other section when the case is closed and having a generally laterally extending wall to provide a recess extending longitudinally around the periphery of said luggage case with said sections closed, said walls of the strips of said two sections forming the sides of said recess, a hook depending from the outer end of said wall, an inside rib at the inner end of said wall, and a plurality of depending flanges intermediate said hook and said rib, said depending flanges extending to positions adjacent said rounded corners; a frame of substantial lateral extent and formed substantially of metallic material, extending around said section and including an inwardly extending flange and a depending flange providing a recess adjacent the outer edge of said frame, and a hook shaped member adjacent said recess, said frame having a series of circumferentially extending grooves intermediate the edges thereof and a thinner inner edge with a bevel adjacent thereto on the outside; a flexible covering extending over the outer edge of said frame and including a welt disposed in said recess, said covering extending across the outer edges of said frame and being folded over the inner edge of said frame, said inner edge of said frame and said folded portion of said cover being disposed between said hook and said depending flange of said strip for holding said cover in taut position; a liner of substantial lateral extent extending around the inside of said frame and having one edge received in the recess formed by said laterally extending flange and said rib of said strip and the other edge received in said hook shaped member of said frame; a series of rivets extending inwardly from said depending flanges of said strip and attaching said liner thereto; hinge means pivotally connecting said sections together along one edge thereof and disposed in said recess; and releasable means for connecting said sections together at the opposite edge thereof, disposed in said recess.

7. A luggage case as defined in claim 6, wherein said liner includes a fabric covering.

References Cited in the file of this patent
UNITED STATES PATENTS

| 2,832,448 | Axtell | Apr. 29, 1958 |
| 2,950,793 | Axtell | Aug. 30, 1960 |